US006557871B2

(12) United States Patent  (10) Patent No.: US 6,557,871 B2
Hsia                     (45) Date of Patent:     May 6, 2003

(54) STROLLER WITH ADJUSTABLE SEAT BACK ARRANGEMENT

(76) Inventor: Ben Ming Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 09/903,998

(22) Filed: Jul. 11, 2001

(65) Prior Publication Data

US 2003/0011155 A1 Jan. 16, 2003

(51) Int. Cl.⁷ .................................................. B62B 7/06
(52) U.S. Cl. .................... 280/47.38; 280/642; 280/647; 297/382
(58) Field of Search ............................ 280/47.34, 47.4, 280/47.38, 47.25, 639, 642, 643, 647, 648, 649, 650, 657, 658, 644; 297/380, 382

(56) References Cited

U.S. PATENT DOCUMENTS

| 2,483,552 A | * | 10/1949 | Lincoln ........................ 297/380 |
| 2,647,563 A | * | 8/1953 | Bishop et al. ............... 297/380 |
| 4,353,577 A | * | 10/1982 | Giordani ........................ 280/42 |
| 4,538,830 A | * | 9/1985 | Nakao et al. ................ 280/647 |
| 4,723,815 A | * | 2/1988 | Kassai ......................... 280/47.4 |
| 4,741,551 A | * | 5/1988 | Perego ......................... 280/47.4 |
| 4,805,928 A | * | 2/1989 | Nakao et al. ............... 280/47.4 |
| 5,195,770 A | * | 3/1993 | Ishikura ....................... 280/647 |
| 5,490,685 A | * | 2/1996 | Kitayama et al. ......... 24/579.09 |
| 5,749,627 A | * | 5/1998 | Perego ......................... 280/647 |
| 6,139,046 A | * | 10/2000 | Aalund et al. ........... 280/47.38 |

* cited by examiner

Primary Examiner—Brian L. Johnson
Assistant Examiner—Kelly E Campbell
(74) Attorney, Agent, or Firm—Raymond Y. Chan; David and Raymond Patent Group

(57) ABSTRACT

An adjustable seat back arrangement for stroller includes two inclination locking devices for selectively locking up a back support on two construction bars respectively, wherein each of the inclination locking devices includes a first and second locking members vertically and spacedly provided between the back support and the respective construction bar and a sliding locker adapted for locking up the first and second locking elements for adjusting a distance between the back support and the respective construction bar so as to adjust an inclined angle between the back support and the seat support.

17 Claims, 5 Drawing Sheets

STROLLER WITH ADJUSTABLE SEAT BACK ARRANGEMENT

BACKGROUND OF THE PRESENT INVENTION

1. Field of Invention

The present invention relates to strollers, and more particularly to a stroller incorporated with an adjustable seat back arrangement, which provides a user of the stroller, such as a baby or a young child, with an adjustable angle of back support.

2. Description of Related Arts

Stroller, which is becomes a necessity to every family having a young child or baby, is consider as a conveniences tool to carry the baby or young child during outdoor activities such as foot traveling and shopping.

A conventional stroller comprises a front frame, a back frame, and a seat frame supported by the front frame and the back frame wherein the seat frame has a seat support portion and a back support portion extended from the seat support portion in an upright manner such that the user which is the baby or a young child is capable of sitting on the seat frame, so as to carry the baby or young child everywhere. However, the baby or young child is forced to sit upright on the stroller. Since the baby or young child is soft and weak, he or she may feel uncomfortable, and serious, the upright type seat frame may hurt his or her backbone permanently.

As shown in FIG. 1, an improved stroller having an inclined back support A1 enables the user to inclinedly lay his or her back thereon wherein the inclined back support A1 comprises a pair of latches A2 having a plurality of engaging teeth A21 pivotally connected to two sides of the back support portion of the seat frame and a pair of rivets A3 protruded from inner sides of the front frame in such a manner that the engaging teeth A21 are selectively engaged with the rivets A3 respectively for adjusting an inclined angle of the back support portion with respect to the seat support portion of the seat frame.

However, such inclined back support A1 of the stroller fails to well support the inclined back of the user. Since the inclined back support A1 supports the back support portion at two sides only, the user has an intention to indent on the seat fabric by his or her own weight downwardly. Thus, the inclined angle of the back support portion is limited by the length of the latches A2 such that the slope of the back support portion may not fittedly support the user's back.

Moreover, the inclined back support A1 will alter the original structural design of the stroller so as to limit the shape of the stroller. Once the parent needs to adjust the inclined angle of the back support portions he or she must disengage the latches A2 at two sides of the seat frame. In other words, the parent must take away the baby or young child from the stroller in order to operate the inclined back support. However, it is impossible for a single parent to handle the baby and operate the inclined back support A1 at the same time.

Also, the inclined angle of the back support portion is limited to only two predetermined angles, i.e, the upright sitting angle and the inclined lying angle. The user and his or her parents have no personal choice for other more comfortable slanted angle.

SUMMARY OF THE PRESENT INVENTION

A main object of the present invention is to provide an adjustable seat back arrangement specifically incorporated with a stroller, which provides a better back support to a user back so that the user is capable of lying on the stroller comfortably.

Another object of the present invention is to provide an adjustable seat back arrangement for stroller, wherein the user can select an inclined angle of the back support of the stroller personally. In other words, the inclination is completely adjustable and the slope of the backs support can be adjusted to fittingly supporting the user's back.

Another object of the present invention is to provide an adjustable seat back arrangement for stroller, wherein the back support can be quickly and easily adjusted its inclined angle with respect to the seat support.

Another object of the present invention is to provide an adjustable seat back arrangement for stroller, which enable the back support to be inclinedly supported without altering or complicating the original structure of the stroller.

Another object of the present invention is to provide an adjustable seat back arrangement for stroller, wherein no expensive or complicate mechanical structure is required to employ in the present invention in order to achieve the above mentioned objects. Therefore, the present invention successfully provided an economic and efficient solution for selectively adjusting the seat back in any inclined angle and providing reinforced back support configuration to the baby carried in the stroller.

Accordingly, in order to accomplish the above objects, the present invention provides a stroller which comprises a supporting frame including a front frame and a back frame, a seat frame supported by the front frame and the back frame, and a handle frame having two construction bars upwardly extended from the supporting frame.

The seat frame comprises a seat support horizontally supported by the front frame and the back frame and a back support upwardly extended from the seat support.

The stroller further comprises an adjustable seat back arrangement which comprises two side supporting units, each having a predetermined holding width, sidewardly extended from two vertical sides of the back support to the two construction bars respectively for folding the back Support between an upright position and a fully extended position and at least two inclination locking means for selectively adjusting the holding widths of the two side supporting units respectively so as to adjust an inclined angle between the back support and the seat support. In which, in the upright position, the back support is vertically extended from the seat support and in the fully extended position, the back support is inclinedly extended from the seat support with a maximum inclined angle between the back support and the seat support.

DETAILED DESCRIPTION OF THE PREFERRED EMBODIMENT

Figure 1:
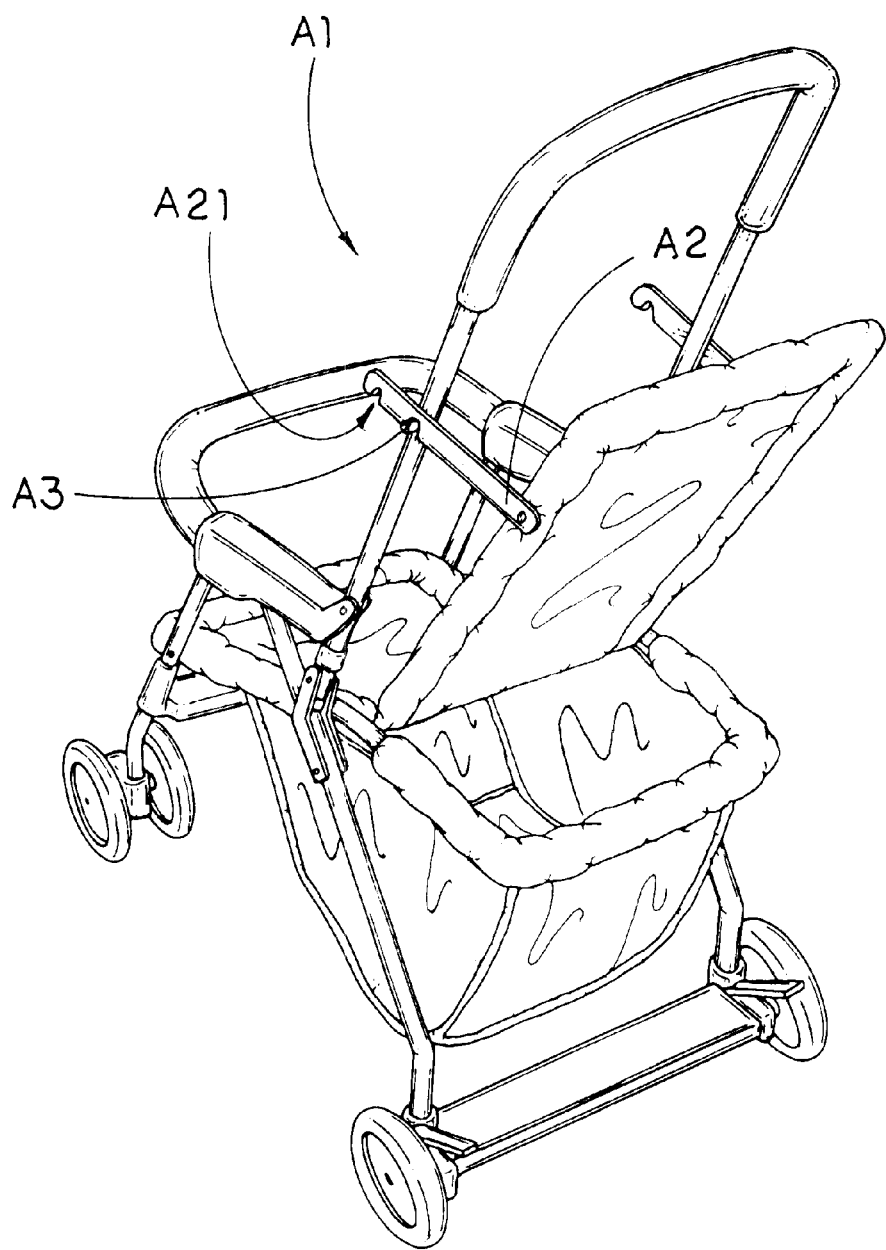
FIG. 1 is a perspective view of a conventional inclined back support of a stroller.
Figure 2:
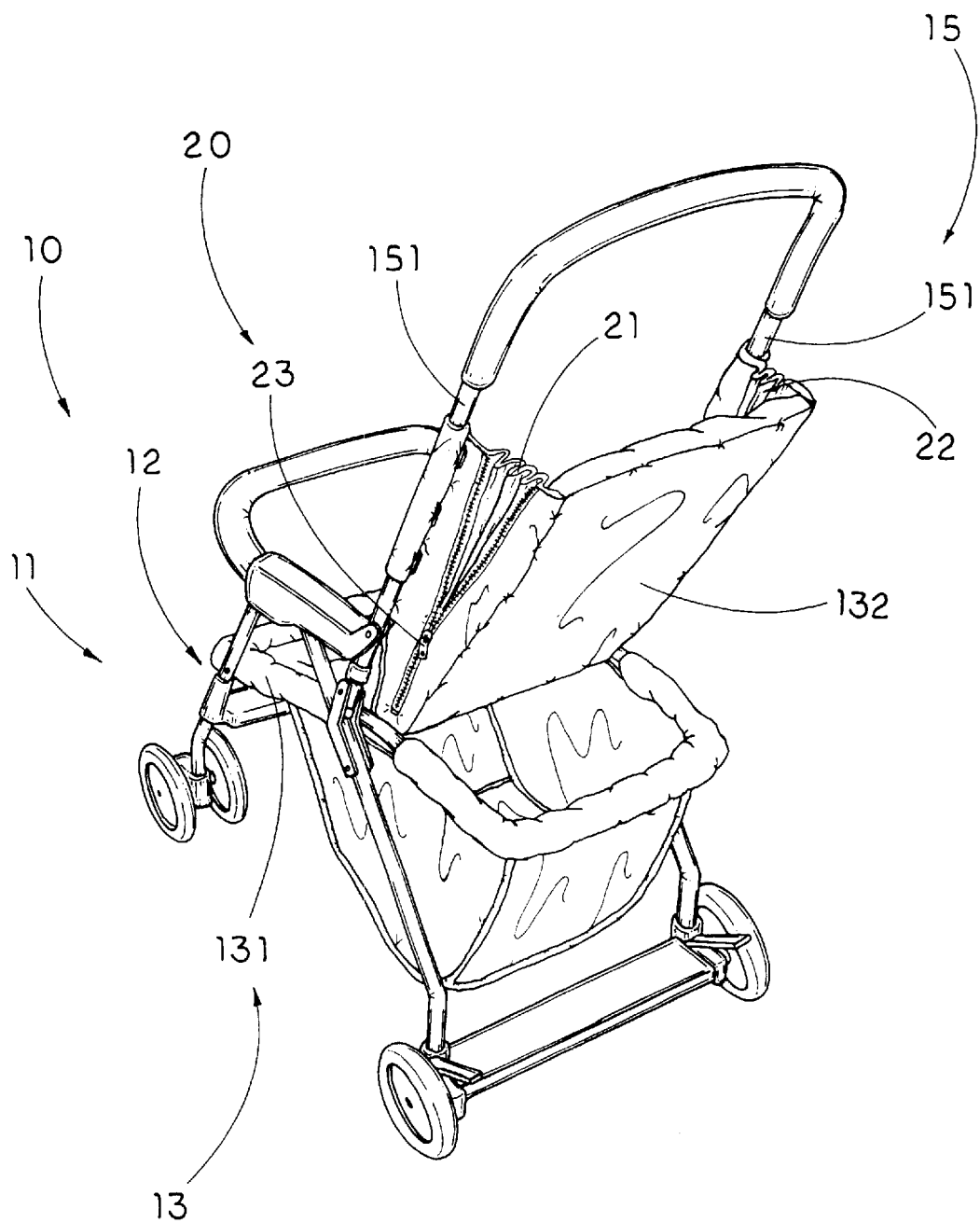
FIG. 2 is a rear perspective view of a stroller incorporated with an adjustable seat back arrangement according to a first preferred embodiment of the present invention.

Referring to FIG. 2 of the drawings, a stroller 10 which is incorporated with an adjustable seat back arrangement 20 according to a first preferred embodiment of the present invention is illustrated. The stroller 10, embodied as a standard stroller, comprises a supporting frame 11 comprising a front frame 12 and a back frame 13, a seat frame 14 supported by the front frame 12 and the back frame 13, and a handle frame 15 having two construction bars 151 upwardly extended from the supporting frame 11.

The seat frame 113 comprises a seat support 131 horizontally supported by the front frame 12 and the back frame 13 and a back support 132 upwardly extended from the seat support 131.

Figure 3:
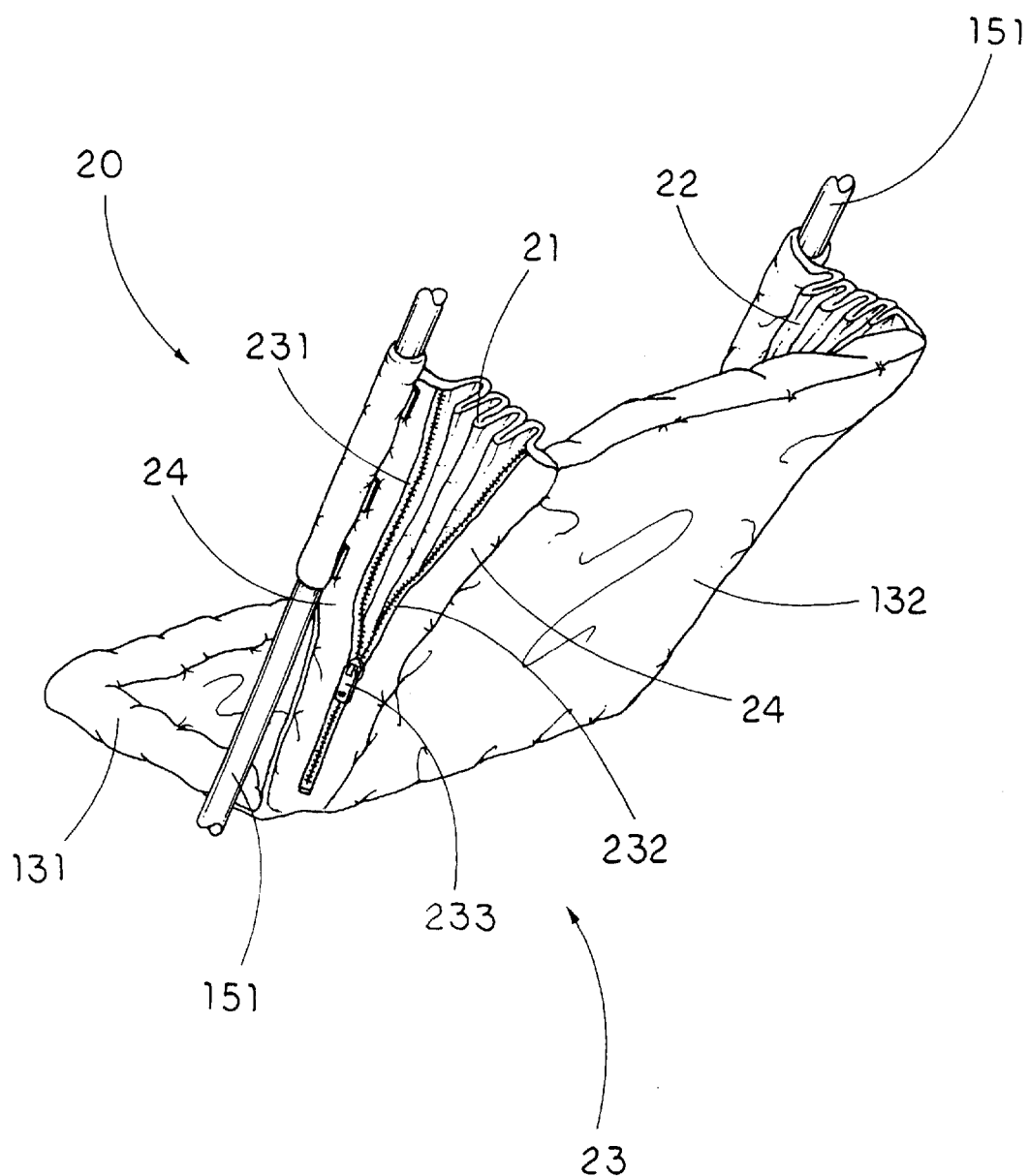
FIG. 3 is a perspective view of the adjustable seat back arrangement incorporated with the stroller according to the above first preferred embodiment of the present invention.

As shown in FIG. 3, each of the inclination locking means 23 comprises first and second locking elements 231, 232 vertically and spacedly provided between the back support 132 and the respective construction bar 151 and a sliding locker 233 adapted for locking up the first and second locking elements 231, 232 for adjusting a distance between the back support 132 and said respective construction bar 151 so as to adjust an inclined angle between the back support 132 and the seat support 131.

The adjustable seat back arrangement 20 further two side supporting units 21, 22, each having a predetermined holding width, sidewardly extended from two vertical sides of the back support 132 to the two construction bars 151 respectively for folding the back support 132 between an upright position and an fully extended position, as shown in FIG. 4B. In which, in the upright position, as shown in FIG. 4A, the back support 132 is vertically extended from the seat support 131 and in the fully extended position, as shown in FIG. 4C, the back support 132 is inclinedly extended from the seat support 131 with a maximum inclined angle between the back support 132 and the seat support 131.

As shown in FIG. 3, each of the inclination locking means 23 comprises a first and second locking members 231, 232 vertically and spacedly provided between the back support 132 and the respective construction bar 151 and a sliding locker 233 adapted for locking up the first and second locking elements 231, 232 for adjusting a distance between the back support 132 and said respective construction bar 151 so as to adjust an inclined angle between the back support 132 and the seat support 131.

Figure 4:
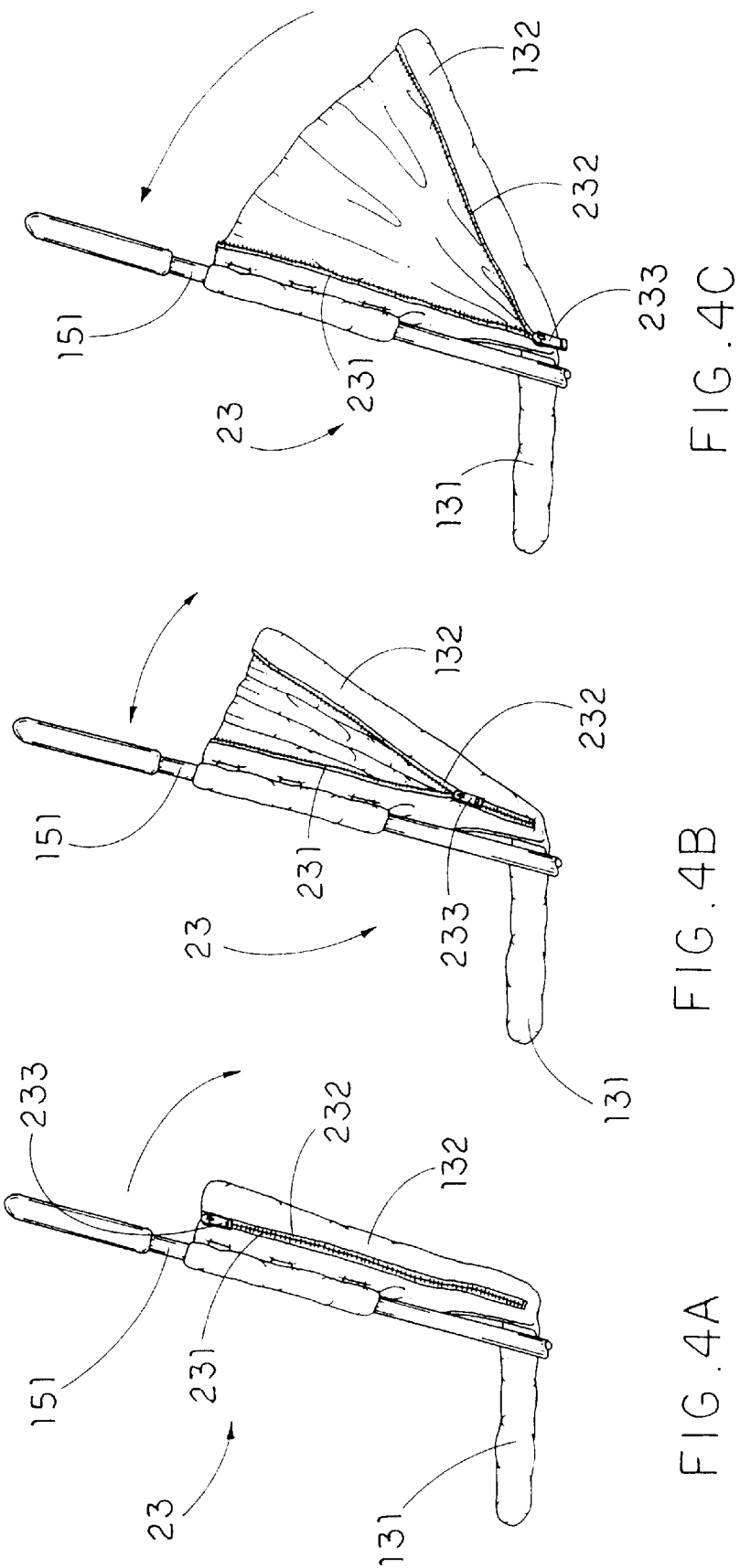
FIG. 4A is a side view of the adjustable seat back arrangement according to the above first preferred embodiment of the present invention, illustrating the back support folded in an upright position.
FIG. 4B is a side view of the adjustable seat back arrangement according to the above first preferred embodiment of the present invention, illustrating the back support folded in an inclined position.
FIG. 4C is a side view of the adjustable seat back arrangement according to the above first preferred embodiment of the present invention, illustrating the back support folded in a fully extended position.

According to a preferred embodiment, the inclination locking means 23 is a zipper wherein the first and second locking elements 231, 232, which are two halves of the zipper having a plurality of engaging tooth, are vertically and spacedly affixed to the side supporting unit 21, 22. The sliding locker 233 is normally locked up bottom ends of the first and second locking elements 231, 232 and arranged in such a manner that when the sliding locker 233 is slid upwardly, the first and second locking elements 231, 232 are fittedly engaged with each other, so as to shorten the holding width of the side supporting unit 21, 22, i.e, the back support 132 tends to fold into the upright position. In other words, when the sliding locker 233 is slid downwardly, the first and second locking elements 231, 232 are disengaged with each other so as to lengthen the holding width of the side supporting unit 21, 22, i.e, the back support 132 tends to fold into the fully extended position, as shown in FIG. 4.

A length of the first and second locking elements 231, 232 must be equal to or less than a height of the side supporting unit 21, 22 such that when the first and second locking elements 231, 232 are engaged together, the holding width of the side supporting unit 21, 22 is reduced between the back support 132 and the construction bar 151. So, the more inclination locking means 23 provided on the side supporting unit 21, 22, the more inclined angles between the back support 132 and the seat support 131 can be adjusted.

Each of the side supporting units 21, 22, which is a trapezoid shaped side fabric flap having a width gradually increasing from a bottom edge to a top edge, is extended from the vertical side of the back support 132 to the respective construction bar 151. An inner side portion of each of the side supporting unit 21, 22 is affixed to the back support 132 by stitching in an edge to edge manner and an outer side portion of each of the side supporting units 21, 22 is substantially affixed to the respective construction bar 151 rivets, so as to limit the maximum inclined angle between the back support 132 and the seat supporting 131 by the width of the side supporting unit 21, 22.

Therefore, the width of tile two side supporting units 21, 22 determines the maximum inclined angle of the back support 132, i.e. the width of the two side supporting units 21, 22 limits the inclined angle of the back support 132 such that the back support 132 can only reach its maximum inclined angle. The holding length of the side supporting unit 21, 22 is a length of the side supporting unit 21, 22 extended from the back support 132 to the Construction bar 151 wherein the holding length of the side supporting unit 21, 22 must be equal to or less than the length thereof so as to adjust the back support 132 between the upright position and the inclined position.

The adjustable seat back arrangement 20 further comprises a reinforcing strap 24 having a predetermined width for securely affixed the inclination locking means 23 on the side supporting unit 21, 22 wherein the reinforcing strap 24, which is made of fabric, has a vertical edge portion firmly affixed on the side supporting unit 21, 22 and an opposed vertical edge portion firmly affixed to the first or second locking elements 231, 232 so as to substantially affixed the first and second locking elements 231, 232 on the side supporting units 21, 22.

Figure 5:
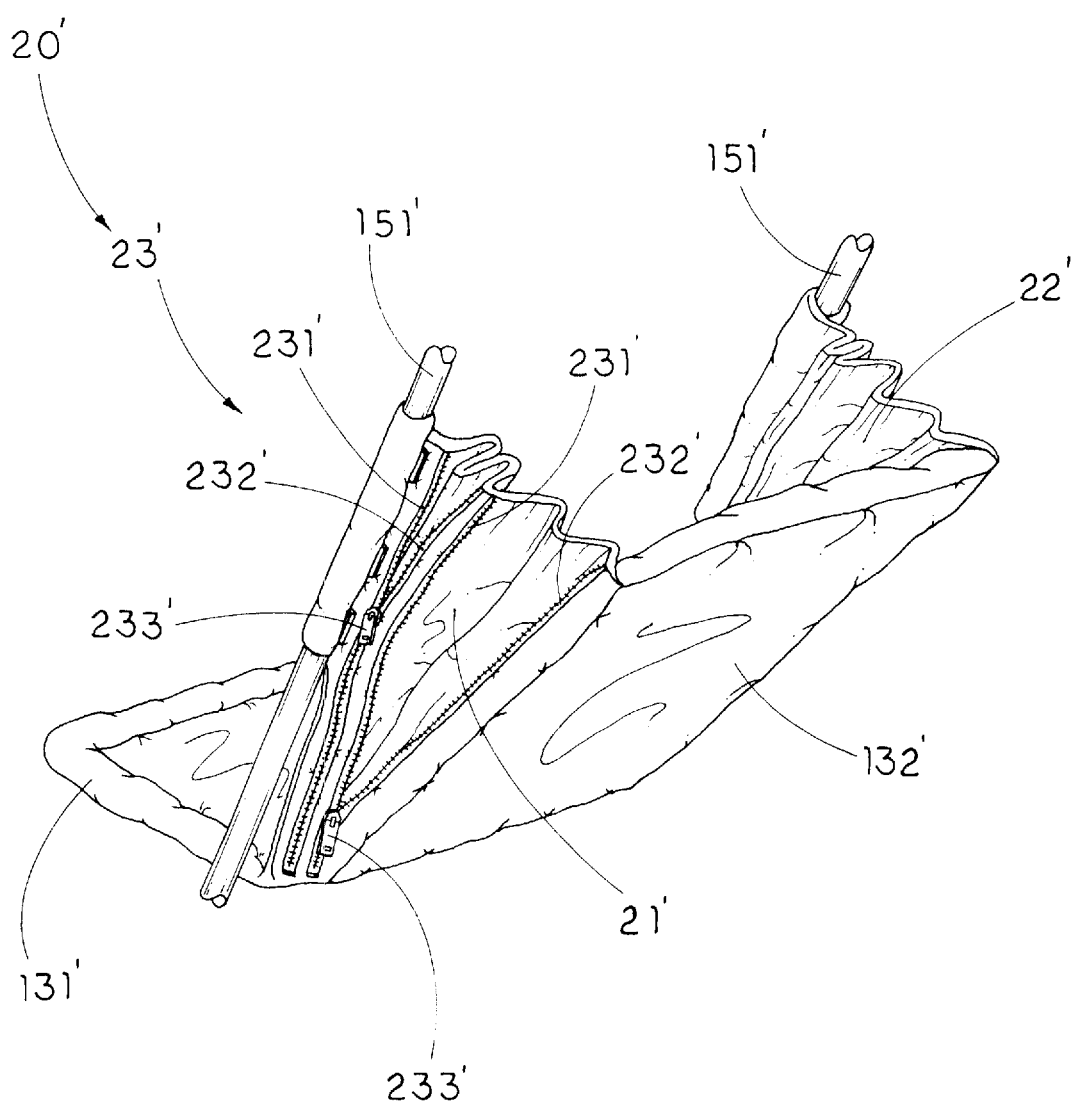
FIG. 5 is a perspective view of an adjustable seat back arrangement according to a second preferred embodiment of the present invention.

Referring to FIG. 5 of the drawings, a second embodiment of the adjustable seat back arrangement 20' illustrates an alternative mode of the first embodiment of the present invention, wherein the adjustable seat back arrangement 20' comprises two pairs of the inclination locking means 23' spacedly provided on the two side supporting units 21', 22' respectively.

As shown in FIG. 5, the two inclination locking means 23' are spacedly affixed to two vertical halves of the respective side supporting unit 21', 22' wherein one of the first locking elements 231' is affixed on the side supporting unit 21', 22' closed to the respective vertical side of the back support 132' and the corresponding second locking element 232' is affixed on a mid-portion of the side supporting unit 21', 22'. Another first locking element 231' is affixed to the mid-portion of the side supporting unit 21', 22' and the corresponding second locking element 232' is affixed on the side supporting unit 21', 22' closed to the construction bar 151'.

Therefore, by adjusting the lock-up position of the two inclination locking means 23' oh the respective side supporting unit 21', 22', the user can adjust the holding length of the side supporting unit 21', 22' extending between the back support 132' and the respective construction bar 151' so as to adjust the inclined angle of the back support 132'. Accordingly, the two inclination locking means 23' on the respective side supporting unit 21', 22' control two halves of the holding width thereof such that when both the two inclination locking means 23' are locked up, the back support 132' is folded into the upright position. When both the two inclination locking means 23' are unlocked, the back support 132' is inclinedly folded into the fully extended position with the maximum inclined angle of the back support 132'. Thus, when one of the inclination locking means 23' is locked up while another one is unlocked, the back support 132' is inclinedly folded between the upright position and the fully extended position, as shown in FIG. 5.

What is claimed is:

1. A stroller, comprising:
   a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and
   an adjustable seat back arrangement, which comprises:
   two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support; and
   at least two inclination locking means for selectively locking said back support to said construction bars respectively, wherein each of said inclination locking means comprises:
   a first locking element and a second locking element provided between said back support and said respective construction bar, wherein said first locking element is affixed on said respective side supporting unit adjacent to said back support and said corresponding second locking element is affixed on said side supporting unit adjacent to said construction bar; and
   a sliding locker which is adapted to lock up said first and second locking elements and selectively adjust a distance between said back support and said respective construction bar so as to adjust an inclined angle between said back support and said seat support, wherein said sliding locker normally locks up two bottom ends of said first and second locking elements and is arranged in such a manner that when said sliding locker is slid upwardly, said first and second locking elements are fittedly engaged with each other, so as to reduce said width between said back support and said construction bars and when said sliding locker is slid downwardly, said first and second locking elements are disengaged with each other, so as to lengthen said width between said back support and said construction bars.

2. The stroller, as recited in claim 1, wherein each of said inclination locking means is a zipper wherein said first and second locking elements two halves of the zipper having a plurality of engaging teeth vertically provided between said back support and said respective construction bar.

3. The stroller, as recited in claim 2, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

4. The stroller, as recited in claim 1, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

5. A stroller, comprising:
   a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and
   an adjustable seat back arrangement comprising at least two inclination locking means for selectively locking said back support to said construction bars respectively, wherein each of said inclination locking means comprises a first locking member and a second locking member provided between said back support and said respective construction bar, and a sliding locker which is adapted to lock up said first and second locking elements and selectively adjust a distance between said back support and said respective construction bar so as to adjust an inclined angle between said back support and said seat support, wherein each of said inclination locking means is a zipper wherein said first and second locking elements are two halves of said zipper having a plurality of engaging teeth vertically provided between said back support and said respective construction bar.

6. The stroller, as recited in claim 5, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

7. A stroller, comprising:
   a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and
   an adjustable seat back arrangement which comprises:
   two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support; and at least two inclination locking means for selectively locking said back support to said construction bars respectively, wherein each of said inclination locking means comprises:
  a first locking element and a second locking element provided between said back support and said respective construction bar, and
  a sliding locker which is adapted to lock up said first and second locking elements and selectively adjust a distance between said back support and said respective construction bar so as to adjust an inclined angle between said back support and said seat support;

wherein each of said inclination locking means is a zipper and said first and second locking elements are two halves of said zipper having a plurality of engaging teeth vertically provided between said back support and said respective construction bar.

8. A stroller, comprising:
a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and
an adjustable seat back arrangement which comprises:
  two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support; and
  at least two inclination locking means for selectively locking said back support to said construction bars respectively, wherein each of said inclination locking means comprises:
    a first locking element and a second locking element provided between said back support and said respective construction bar, and
    a sliding locker which is adapted to lock up said first and second locking elements and selectively adjust a distance between said back support and said respective construction bar so as to adjust an inclined angle between said back support and said seat support; and
    a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

9. A stroller, comprising:
a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and
an adjustable seat back arrangement which comprises:
  two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support; and
  two pairs of said inclination locking means provided on two side supporting units respectively for selectively locking said back support to said construction bars respectively, wherein each pair of said inclination locking means is spacedly affixed to two vertical halves of said respective side supporting unit and each of said inclination locking means comprises:
    a first locking element and a second locking element provided between said back support and said respective construction bar, wherein one of said first locking elements of one pair of said inclination locking means is affixed on said side respective supporting unit closed to said respective vertical side of said back support and said corresponding second locking element is affixed on a mid-portion of said side supporting unit and another first locking element of said pair of said inclination locking means is affixed to said mid-portion of said side supporting unit and said corresponding second locking element is affixed on said side supporting unit closed to said construction bar, in such a manner that each inclination locking means controls half of said width of said side supporting unit; and
    a sliding locker which is adapted to lock up said first and second locking elements and selectively adjust a distance between said back support and said respective construction bar so as to adjust an inclined angle between said back support and said seat support.

10. The stroller, as recited in claim 9, wherein each said sliding locker normally locks up two bottom ends of said first and second locking elements and is arranged in such a manner that when said sliding locker is slid upwardly, said first and second locking elements are fittedly engaged with each other, so as to reduce said width between said back support and said construction bars and when said sliding locker is slid downwardly, said first and second locking elements are disengaged with each other, so as to lengthen said width between said back support and said construction bars.

11. The stroller, as recited in claim 9, wherein each of said inclination locking means is a zipper wherein said first and second locking elements are two halves of the zipper having a plurality of engaging tooth vertically provided between said back support and said respective construction bar.

12. The stroller, as recited in claim 10, wherein each of said inclination locking means is a zipper wherein said first and second locking elements are two halves of the zipper having a plurality of engaging teeth vertically provided between said back support and said respective construction bar.

13. The stroller, as recited in claim 12, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

14. The stroller, as recited in claim 10, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and, an opposed vertical edge portion firmly affixed to said first and second locking elements so as to substantially affixed said first and second locking elements on said side supporting units.

15. A stroller, comprising:

a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and an adjustable seat back arrangement which comprises:

two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support; and two pairs of said inclination locking means provided on two side supporting units respectively for selectively locking said back support to said construction bars respectively, wherein each pair of said inclination locking means is spacedly affixed to two vertical halves of said respective side supporting unit and each of said inclination locking means comprises:

a first locking element and a second locking element provided between said back support and said respective construction bar, and a sliding locker which is adapted to lock up said first and second locking elements and selectively adjust a distance between said back support and said respective construction bar so as to adjust an inclined angle between said back support and said seat support;

wherein each of said inclination locking means is a zipper wherein said first and second locking elements are two halves of the zipper having a plurality of engaging teeth vertically provided between said back support and said respective construction bar.

16. The stroller, as recited in claim 15, wherein said adjustable seat back arrangement further comprises a reinforcing strap having a predetermined width for securely affixed said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

17. A stroller, comprising:

a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and an adjustable seat back arrangement which comprises:

two side supporting units sidewardly extended from two vertical sides of said back support to said two construction bars respectively for folding said back support between an upright position and a fully extended position, wherein in said upright position, said back support is vertically extended from said seat support, and in said fully extended position, said back support is inclinedly extended from said seat support with a maximum inclined angle between said back support and said seat support;

two pairs of said inclination locking means provided on two side supporting units respectively for selectively locking said back support to said construction bars respectively, wherein each pair of said inclination locking means is spacedly affixed to two vertical halves of said respective side supporting unit and each of said inclination locking means comprises:

a first locking element and a second locking element provided between said back support and said respective construction bar, and a sliding locker which is adapted to lock up said first and second locking elements and selectively adjust a distance between said back support and said respective construction bar so as to adjust an inclined angle between said back support and said seat support; and a reinforcing strap having a predetermined width for securely affixed each of said inclination locking means on said side supporting unit wherein said reinforcing strap has a vertical edge portion firmly affixed on said side supporting unit and an opposed vertical edge portion firmly affixed to said first and second locking elements so as to substantially affixed said first and second locking elements on said side supporting units.

* * * * *

(12) EX PARTE REEXAMINATION CERTIFICATE (8810th)
United States Patent
Hsia

(10) Number: US 6,557,871 C1
(45) Certificate Issued: Jan. 17, 2012

(54) STROLLER WITH ADJUSTABLE SEAT BACK ARRANGEMENT

(76) Inventor: Ben Ming Hsia, Northridge, CA (US)

Reexamination Request:
No. 90/009,874, Feb. 3, 2011

Reexamination Certificate for:
Patent No.: 6,557,871
Issued: May 6, 2003
Appl. No.: 09/903,998
Filed: Jul. 11, 2001

(51) Int. Cl.
*B62B 7/06* (2006.01)

(52) U.S. Cl. .................. 280/47.38; 280/642; 280/647; 297/382
(58) Field of Classification Search ............... 280/47.38
See application file for complete search history.

(56) References Cited

To view the complete listing of prior art documents cited during the proceeding for Reexamination Control Number 90/009,874, please refer to the USPTO's public Patent Application Information Retrieval (PAIR) system under the Display References tab.

*Primary Examiner* — Jeffrey R. Jastrzab

(57) ABSTRACT

An adjustable seat back arrangement for stroller includes two inclination locking devices for selectively locking up a back support on two construction bars respectively, wherein each of the inclination locking devices includes a first and second locking members vertically and spacedly provided between the back support and the respective construction bar and a sliding locker adapted for locking up the first and second locking elements for adjusting a distance between the back support and the respective construction bar so as to adjust an inclined angle between the back support and the seat support.

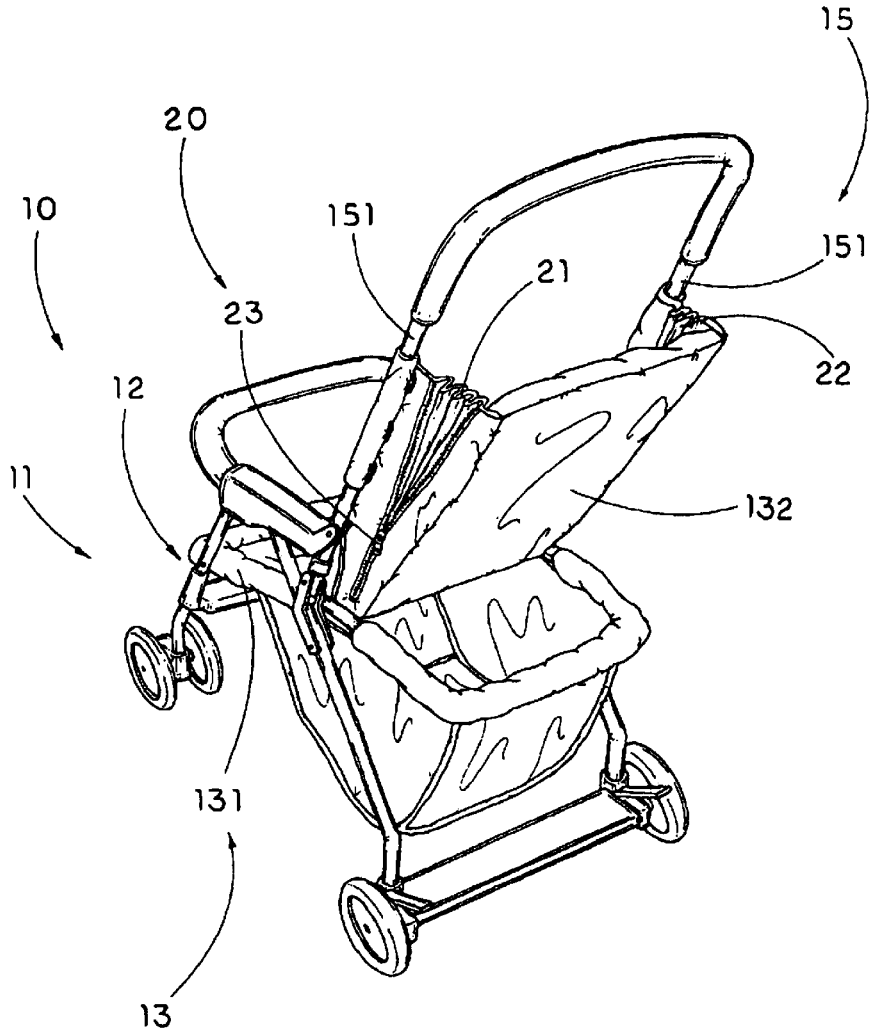

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *